(12) United States Patent
Anderson et al.

(10) Patent No.: US 8,089,486 B2
(45) Date of Patent: Jan. 3, 2012

(54) TILED PREFETCHED AND CACHED DEPTH BUFFER

(75) Inventors: Michael Hugh Anderson, Leucadia, CA (US); Dan Minglun Chuang, San Diego, CA (US); Geoffrey Shippee, Palo Alto, CA (US); Rajat Rajinderkumar Dhawan, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 11/086,474

(22) Filed: Mar. 21, 2005

(65) Prior Publication Data

US 2006/0209078 A1   Sep. 21, 2006

(51) Int. Cl.
*G06T 1/20* (2006.01)
(52) U.S. Cl. ........................................................ 345/506
(58) Field of Classification Search ................. 345/419, 345/421, 422, 501, 502, 503, 504, 505, 506, 345/613, 614, 625, 628, 691, 694, 533, 537, 345/541, 543, 545, 530, 557, 631, 420; 711/117, 711/118, 119, 120, 121, 122, 123, 124
See application file for complete search history.

(56) References Cited

U.S. PATENT DOCUMENTS

| | | | |
|---|---|---|---|
| 5,440,682 A * | 8/1995 | Deering | 345/503 |
| 5,559,952 A | 9/1996 | Fujimoto | |
| 5,933,156 A * | 8/1999 | Margolin | 345/545 |
| 5,982,376 A | 11/1999 | Abe et al. | |
| 6,008,820 A * | 12/1999 | Chauvin et al. | 345/502 |
| 6,115,047 A * | 9/2000 | Deering | 345/422 |
| 6,480,205 B1 * | 11/2002 | Greene et al. | 345/631 |
| 6,525,726 B1 * | 2/2003 | Xie et al. | 345/421 |
| 6,614,444 B1 | 9/2003 | Duluk, Jr. et al. | |
| 6,636,214 B1 | 10/2003 | Leather et al. | |
| 6,693,639 B2 * | 2/2004 | Duluk et al. | 345/506 |
| 6,717,576 B1 * | 4/2004 | Duluk et al. | 345/419 |
| 6,924,810 B1 * | 8/2005 | Tischler | 345/541 |
| 7,002,571 B2 * | 2/2006 | Lake et al. | 345/420 |
| 7,167,181 B2 * | 1/2007 | Duluk et al. | 345/506 |
| 7,450,120 B1 * | 11/2008 | Hakura et al. | 345/421 |

(Continued)

FOREIGN PATENT DOCUMENTS

JP   06332664   12/1994

(Continued)

OTHER PUBLICATIONS

Park W-C et al: "An Effective Pixel Rasterazation Pipeline Architecture for 3D Rendering Processors". IEEE Transactions on Computers, IEEE Service Center, Los Alamitos, CA, US, vol. 52, No. 11, Dec. 31, 2003 , pp. 1501-1508.

Szanto P, et al: "High Performance Visibility Testing With Screen Segmentation" Embedded Systems for Real-Time Multimedia, 2004. Estimedia 2004. 2ND Workshop on Stockholm, Sweden Sep. 6-7, 2004, Piscataway, NJ, USA, IEEE, Sep. 6, 2004 , pp. 75-80.

(Continued)

*Primary Examiner* — Amare Mengistu
*Assistant Examiner* — Aaron M Guertin
(74) *Attorney, Agent, or Firm* — Timothy F. Loomis; James R. Gambale

(57) ABSTRACT

A 3D graphics pipeline includes a prefetch mechanism that feeds a cache of depth tiles. The prefetch mechanism may be predictive, using triangle geometry information from previous pipeline stages to pre-charge the cache, thereby allowing for an increase in memory bandwidth efficiency. A z-value compression technique may be optionally utilized to allow for a further reduction in power consumption and memory bandwidth.

22 Claims, 7 Drawing Sheets

U.S. PATENT DOCUMENTS

| | | | | |
|---|---|---|---|---|
| 2002/0118202 | A1* | 8/2002 | Baldwin | 345/530 |
| 2004/0212614 | A1* | 10/2004 | Aila et al. | 345/421 |
| 2004/0233208 | A1* | 11/2004 | Hussain | 345/557 |
| 2004/0246260 | A1* | 12/2004 | Kim et al. | 345/557 |

FOREIGN PATENT DOCUMENTS

| | | |
|---|---|---|
| JP | 08221593 | 8/1996 |
| JP | 2000507010 T | 6/2000 |
| JP | 2002269583 | 9/2002 |
| JP | 2003058905 | 2/2003 |
| JP | 2003281564 | 10/2003 |
| JP | 2004510270 | 4/2004 |
| WO | WO 9734231 | 9/1997 |
| WO | WO 0227661 A2 | 4/2002 |

OTHER PUBLICATIONS

Chen W.Y., et al: "An Efficient Architecture for Loop Based Data Preloading" Sigmicro Newsletter USA, vol. 23, No. 1-2, Dec. 1992, pp. 92-101.

Walter, et al: "Enhancing and Optimizing the Render Cache" EGRW '02, Proceedings of the 13th Eurographics Workshop on Rendering, 2002., [Online] Dec. 31, 2002, pp. 37-42.

"The Design of High-Performance 3D Graphics Accelerator for Reliastic Images", Korean Ministry of Education, Science and Technology; Project Report 2000-N-NL-01-C-133, Feb. 2002.

International Search Report and Written Opinion—PCT/US06/010340, International Search Authority—European Patent Office—Aug. 22, 2006.

* cited by examiner

TILED PREFETCHED AND CACHED DEPTH BUFFER

BACKGROUND OF THE INVENTION

1. Field of the Invention

The present disclosure generally relates to graphics processors, and more particularly, the present disclosure relates to a 3D graphics pipeline which is contained in a graphics processor.

2. Description of the Related Art

Graphics engines have been utilized to display three-dimensional (3D) images on fixed display devices, such as computer and television screens. These engines are typically contained in desk top systems powered by conventional AC power outlets, and thus are not significantly constrained by power-consumption limitations. A recent trend, however, is to incorporate 3D graphics engines into battery powered handheld devices. Examples of such devices include mobile phones and personal data assistants (PDAs). Unfortunately, however, conventional graphics engines consume large quantities of power and are thus not well-suited to these low-power operating environments.

FIG. 1 is a schematic block diagram of a basic Open GL rasterization pipeline contained in a conventional 3D graphics engine. As shown, the rasterization pipeline of this example includes a triangle setup stage 101, a pixel shading stage 102, a texture mapping stage 103, a texture blending stage 104, a scissor test stage 105, an alpha test stage 106, a stencil test stage 107, a hidden surface removal (HSR) stage 108, an alpha blending stage 109, and a logical operations stage 110.

In 3D graphic systems, each object to be displayed is typically divided into surface triangles defined by vertex information, although other primitive shapes can be utilized. Also typically, the graphics pipeline is designed to process sequential batches of triangles of an object or image. The triangles of any given batch may visually overlap triangles of another batch, and it is also possible for triangles within a given batch to overlap one another.

Referring to FIG. 1, the triangle setup stage 101 "sets up" each triangle by computing setup coefficients to be used in computations executed by later pipeline stages.

The pixel shading stage 102 uses the setup coefficients to compute which pixels are encompassed by each triangle. Since the triangles may overlap one another, multiple pixels of differing depths may be located at the same point on a screen display. In particular, the pixel shading stage 101 interpolates color, fog, depth values, texture coordinates, alpha values, etc., for each pixel using the vertex information. Any of a variety of shading techniques can be adopted for this purpose, and shading operations can take place on per triangle or per pixel basis.

The texture mapping stage 103 and texture blending stage 104 function to add and blend texture into each pixel of the process batch of triangles. Very generally, this is done by mapping pre-defined textures onto the pixels according to texture coordinates contained within the vertex information. As with shading, a variety of techniques may be adopted to achieve texturing. Also, a technique known as fog processing may be implemented as well.

The scissor test stage 105 functions to discard pixels contained in portions (fragments) of triangles which fall outside the field of view of the displayed scene. Generally, this is done by determining whether pixels lie within a so-called scissor rectangle.

The alpha test unit 106 conditionally discards a fragment of a triangle (more precisely, pixels contained in the fragment) based on a comparison between an alpha value (transparency value) associated with the fragment and a reference alpha value. Similarly, the stencil test conditionally discards fragments based on a comparison between each fragments and a stored stencil value.

The HSR stage 108 (also called a depth test stage) discards pixels contained in triangle fragments based on the depth values of other pixels having the same display location. Generally, this is done by comparing a z-axis value (depth value) of a pixel undergoing the depth test with a z-axis value stored in a corresponding location of a so-called z-buffer (or depth buffer). The tested pixel is discarded if the z-axis value thereof indicates that the pixel would be blocked from view by another pixel having its z-axis value stored in the z-buffer. On the other hand, the z-buffer value is overwritten with the z-axis value of the tested pixel in the case where the tested pixel would not be blocked from view. In the manner, underlying pixels which are blocked from view are discarded in favor of overlying pixels.

The alpha blending stage 109 combines rendered pixels with previously stored pixels in a color buffer based on alpha values to achieve transparency of an object.

The logical operations unit 110 generically denotes miscellaneous remaining processes of the pipeline for ultimately obtaining pixel display data.

In any graphics system, it is desired to conserve processor and memory bandwidth to the extent possible while maintaining satisfactory performance. This is especially true in the case of portable or hand-held devices where bandwidths may be limited. Also, as suggested previously, there is a particular demand in the industry to minimize power consumption and enhance bandwidth efficiency when processing 3D graphics for display on portable or hand-held devices.

SUMMARY OF THE INVENTION

According to one aspect of embodiments of the present disclosure, a graphics processor is provided which includes a rasterization pipeline including a plurality of sequentially arranged processing stages which render display pixel data from input primitive object data. The processor further include a memory which stores data utilized by at least one of the processing stages of the rasterization pipeline, and a prefetch mechanism which retrieves the data utilized by the at least one processing stage with respect to a processed pixel in advance of the processed pixel being arriving at the at least one processing stage.

According to still another aspect of embodiments of the present disclosure, a graphics processor is provided which includes a rasterization pipeline including a plurality of sequentially arranged processing stages which render display pixel data from input primitive object data, where the processing stages include a hidden surface removal (HSR) stage. The processor further includes a depth buffer which stores a depth value of a previously rendered pixel, a memory controller which retrieves the depth value of the previously rendered pixel, and a cache memory which is coupled to the HSR stage of the pipeline and which stores the depth value retrieved by the memory controller.

According to still another aspect of embodiments of the present disclosure, a graphics processor is provided which includes a rasterization pipeline including a plurality of sequentially arranged processing stages which render display pixel data from input primitive object data, where the processing stages include a hidden surface removal (HSR) stage.

The processor further includes a depth buffer which stores depth values of a two-dimensional block of pixels, a block address generator which generates a block address of the two-dimensional block of pixels which includes a processed pixel, a cache memory coupled to the HSR stage of the rasterization processor, and a memory controller which is responsive to the block address to retrieve the depth values of the two-dimensional block of pixels from the depth buffer and stores the depth values in the cache memory.

According to still another aspect of embodiments of the present disclosure, a graphics processor is provided which includes a rasterization pipeline including a plurality of sequentially arranged processing stages which render display pixel data from input primitive object data, and means for pre-fetching data from a main memory and supplying the data to at least one of the processing stages in advance of a pixel data arriving at the at least one processing stage through the rasterization pipeline.

According to still another aspect of embodiments of the present disclosure, a graphics processor is provided which includes a rasterization pipeline including a plurality of sequentially arranged processing stages which render display pixel data from input primitive object data, where the processing stages include a hidden surface removal (HSR) stage. The processor further includes a hierarchical depth buffer which stores depth values of two-dimensional block of pixels, a random access memory which is coupled to the HSR stage and which stores a maximum depth value and a minimum depth value of the depth values of the two-dimensional block of pixels, a block address generator which generates a block address of the two-dimensional block of pixels which includes a processed pixel, a cache memory coupled to the HSR stage of the rasterization processor, and a memory controller which is responsive to the block address to retrieve the depth values of the two-dimensional block of pixels from the depth buffer and stores the depth values in the cache memory.

According to still another aspect of embodiments of the present disclosure, a graphics processor is provided which includes a rasterization pipeline including a plurality of sequentially arranged processing stages which render display pixel data from input primitive object data, where the processing stages include a hidden surface removal (HSR) stage. The processor further includes a depth buffer including two-dimensional blocks of depth values data associated with the pixel data rendered by the rasterization pipeline, wherein the primitive object data is indicative of a primitive shape, and wherein the depth values data of a two-dimensional block is compressed in the case where the two-dimensional block is contained completely within the primitive shape containing a processed pixel.

According to still another aspect of embodiments of the present disclosure, a graphics processing method is provided which includes supplying primitive object data to a rasterization pipeline which includes a plurality of sequentially arranged processing stages which render display pixel data from input primitive object data, storing data utilized by at least one of the processing stages of the rasterization pipeline in a memory, and pre-fetching from the memory the data utilized by the at least one processing stage with respect to a processed pixel in advance of the processed pixel being arriving at the at least one processing stage.

According to still another aspect of embodiments of the present disclosure, a graphics processing method is provided which includes supplying primitive object data to a rasterization pipeline which includes a plurality of sequentially arranged processing stages which render display pixel data from input primitive object data, where the processing stages include a hidden surface removal (HSR) stage, and selectively compressing two-dimensional blocks of depth values data in a depth buffer. The primitive object data is indicative of a primitive shape, and the depth values data of a two-dimensional block is compressed when the two-dimensional block is contained completely within the primitive shape containing a processed pixel.

BRIEF DESCRIPTION OF THE DRAWINGS

The above and other aspects of the disclosed embodiments will become readily apparent from the detailed description that follows, with reference to the accompanying drawings, in which.

DETAILED DESCRIPTION OF PREFERRED EMBODIMENTS

Some embodiments herein are at least partially characterized by a 3D graphics pipeline which includes a prefetch mechanism that feeds a cache of depth tiles. The prefetch mechanism may be predictive, using triangle geometry information from previous pipeline stages to pre-charge the cache, thereby allowing for an increase in memory bandwidth efficiency.

Other embodiments are at least partially characterized by a z-value compression technique which allows for a reduction in power consumption and memory bandwidth.

Several preferred but non-limiting embodiments will now be described.

The triangle setup block of a 3D graphics pipeline may be preceded by what is referred to herein as a command block. The command block contains all relevant data as to each triangle, including pixel screen location information. According to embodiments of the present disclosure, pixel screen location data is fed forward in the pipeline and used by later pipeline stages to compute addresses of data needed for pixel processing. By the time the pixels arrive at a given stage, the values associated with the stage will already be in the cache, thus allowing for an improvement in bandwidth efficiency.

Figure 1:
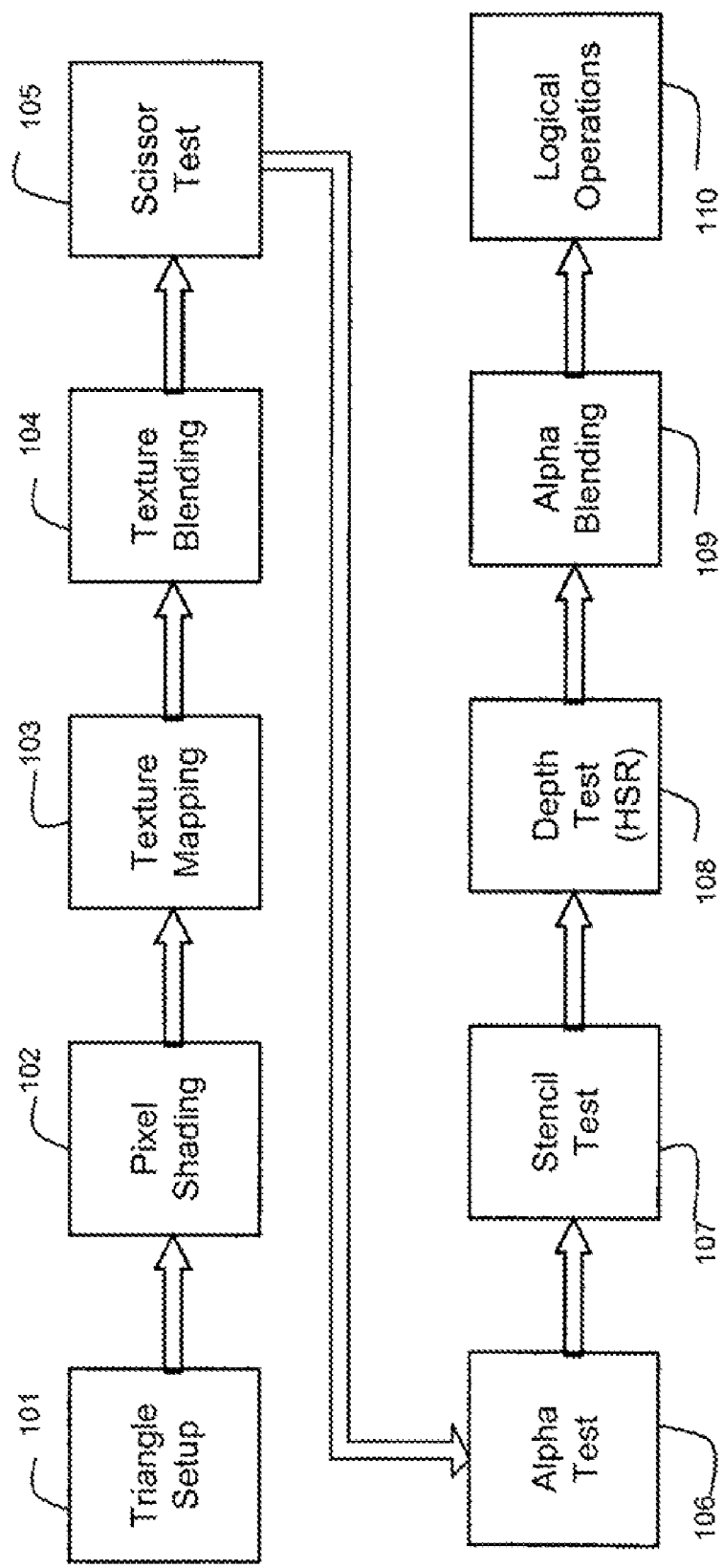
FIG. 1 is a schematic block diagram of an example of a basic Open GL rasterization pipeline contained in a 3D graphics engine.
Figure 2:
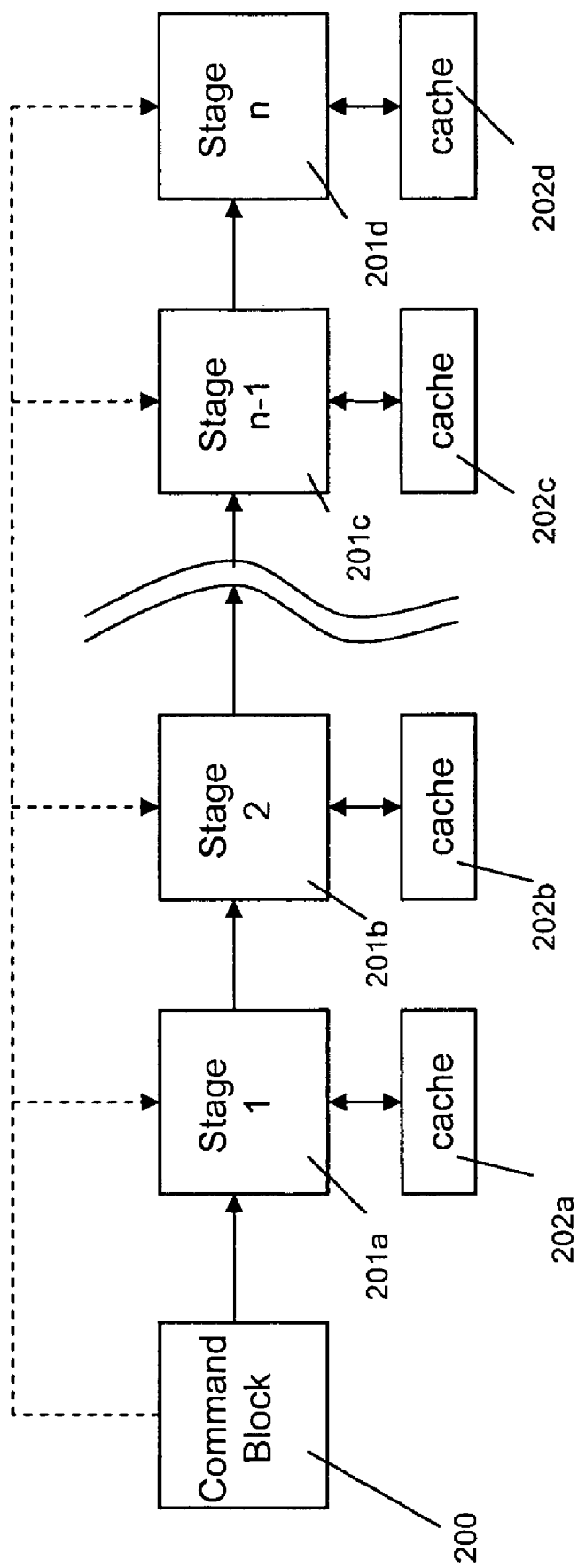
FIG. 2 illustrates a simplified example of a circuit block configuration of a graphics pipeline according to an embodiment of the present disclosure.

FIG. 2 is a simplified block diagram illustrating an embodiment of the present disclosure. A 3D graphics pipeline is depicted having a command block 200 and first through n$^{th}$ pipeline blocks 201a . . . 201n. At least one of the pipeline blocks is operatively equipped with a cache memory 202a . . . 202d. By forwarding address information to the pipeline stage(s) 1, 2, n−1 and/or n in advance, it becomes possible to retrieve relevant data from a main memory in advance of the arrival of a processed pixel to the pipeline stage(s). In this manner, memory throughput is increased.

Also, in an alternative embodiment, the pre-fetching mechanism is accompanied by a predictive mechanism to further enhance memory efficiency. This is described later with reference to FIG. 3, which is directed to the example of predictive pre-fetching of z-values (depth values) from a depth buffer.

Three-dimensional (3D) rasterization pipelines utilize a "depth test" to determine whether a newly processed pixel is obscured by a previously rendered pixel. The mechanism involves accessing a "depth buffer" (also called a "z-buffer") into which depth values (i.e., z values) are stored and checked during rasterization. Essentially any visible pixel's distance from the viewer is stored as a depth value in the depth buffer. Subsequently, another processed pixel may attempt to occupy the same position on the screen. The depth value of the previously rendered pixel (i.e., the depth valued stored in the depth buffer at the pixel position) is read and compared with the value of the newly processed pixel. If the comparison result indicates that the new pixel is closer to the viewer, then it is deemed to be visible, and the previous depth value of the depth buffer may be overwritten with the depth value of the new pixel. The new pixel is further processed by the pipeline, and eventually rendered in a frame buffer. On the other hand, if the comparison result indicates that the new pixel is farther from the viewer, then it is deemed to be invisible, and the new pixel may be discarded and the previous depth value of the depth buffer is maintained. This process is referred to herein as Hidden Surface Removal (HSR).

Figure 3:
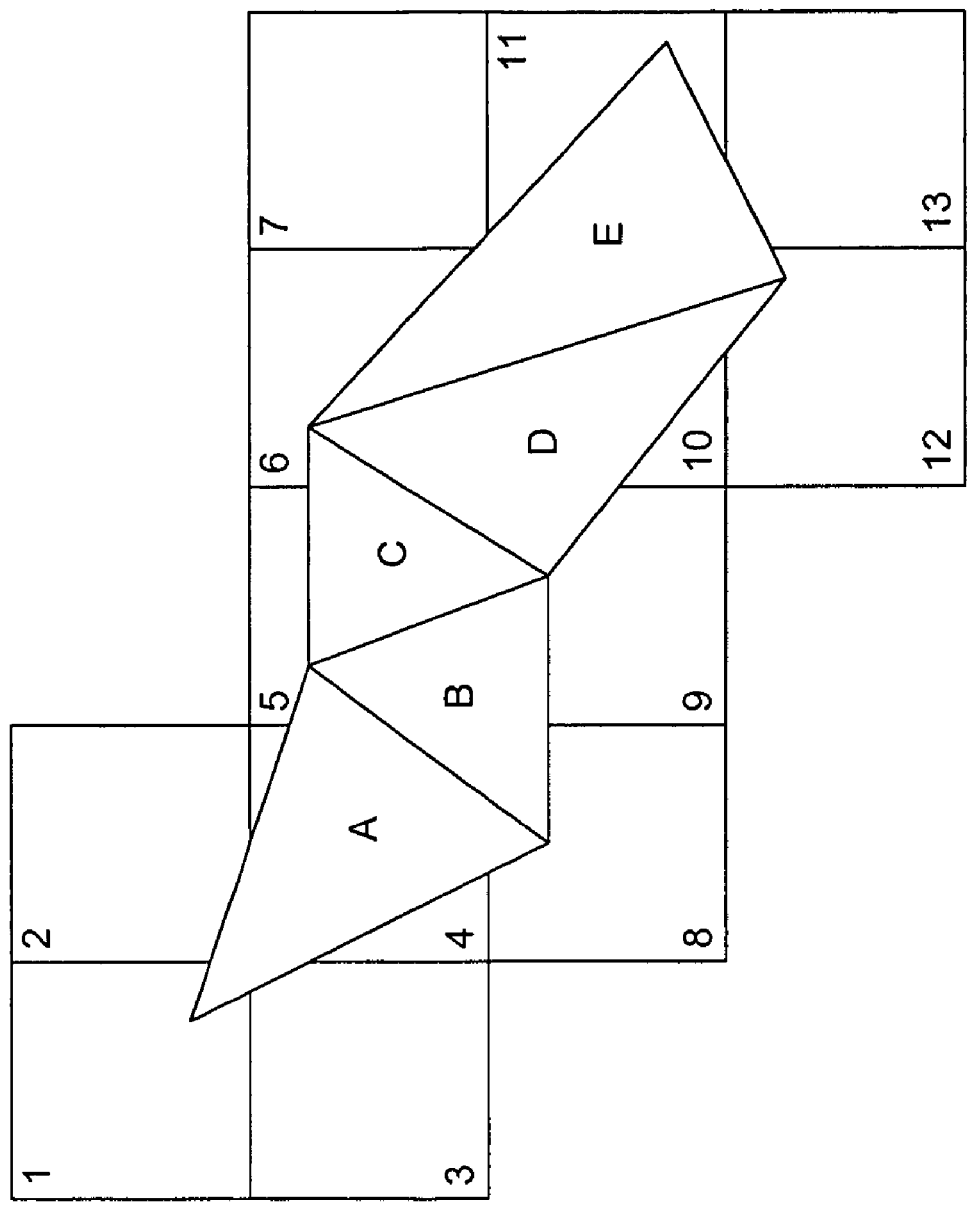
FIG. 3 is a view for explaining the predictive pre-fetching of pixel tiles according to another embodiment of the present disclosure.

FIG. 3 illustrates an example of how a triangle strip might map onto z-value pixel tiles. The triangles are labeled A through E, and appear on the pipeline in that order. The tiles are numbered 1-13. In order to process triangle A, tiles 1, 2, 3, 4, 5 and 8 are needed. Accordingly, the z-values of the pixel tiles 1, 2, 3, 4, 5 and 8 are pre-fetched from the depth buffer and stored in cache memory. Next, in order to process triangle B, pixel tiles 4, 5, 8 and 9 are needed. However, since pixel tiles 4, 5 and 8 are already stored in cache memory, it is only necessary to pre-fetch pixel tile 9 from the depth buffer. Similarly with triangle C, only tile 6 must be pre-fetched. Memory bandwidth efficiency is enhanced by predictively caching tiles in this manner.

Figure 4:
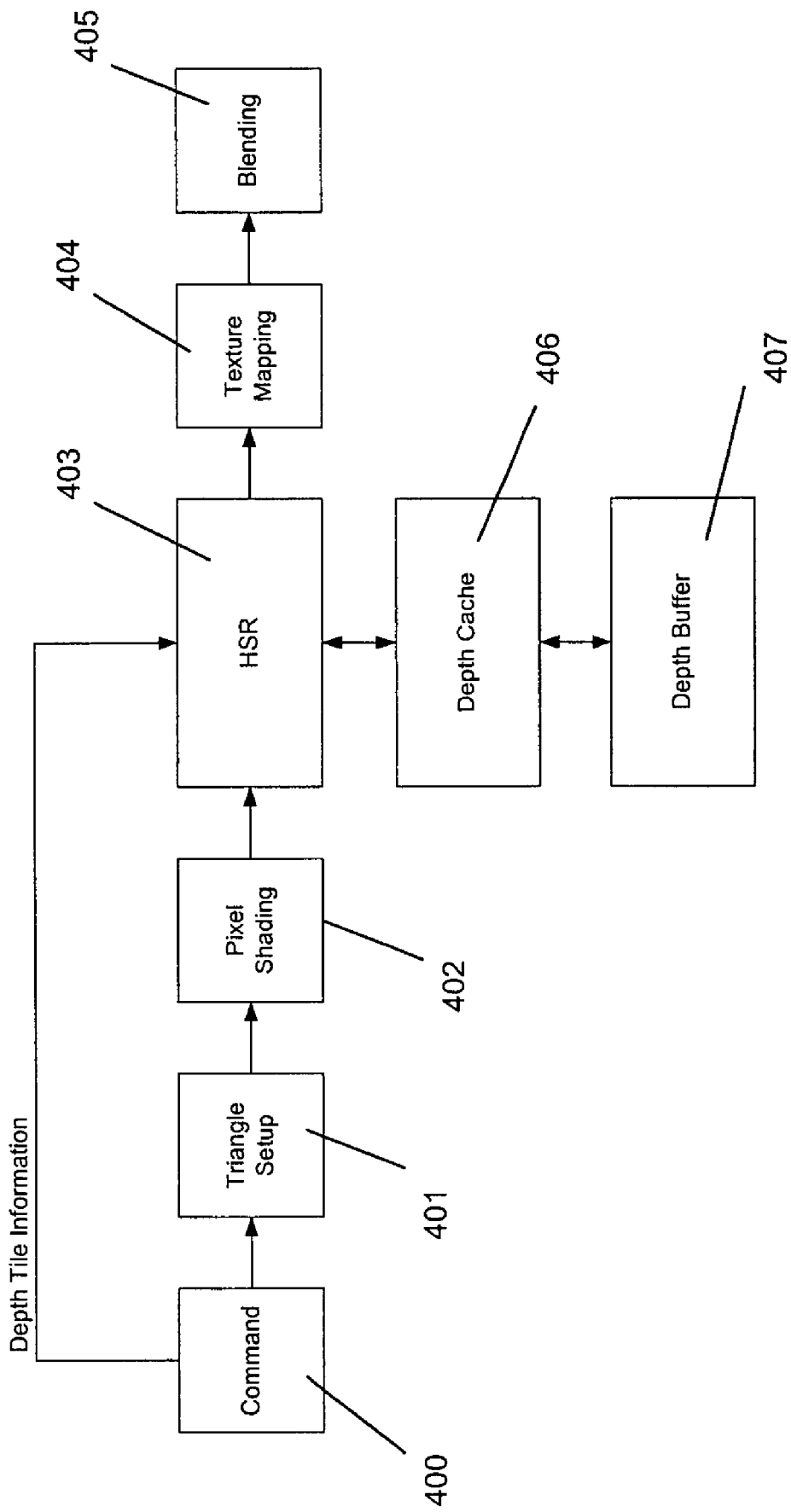
FIG. 4 illustrates a simplified example of a circuit block configuration of a graphics pipeline according to another embodiment of the present disclosure.

FIG. 4 is block diagram of an example of 3D graphics pipeline which is configured for pre-fetching of z-values to be utilized in a Hidden Surface Removal (HSR) block of the pipeline. In the figure, the pipeline includes a command block 400, a triangle setup block 401, a pixel shading block 402, an HSR block 403, a texture mapping block 404 and a texture blending block 405. In addition, the HSR block 403 is equipped with a depth cache 406 and has access to a depth buffer 407.

In operation, address information of depth pixel tiles is forwarded from the command block 400 directly to the HSR block 403. The HSR block 403 is configured to pre-fetch depth values from the depth buffer 407 according to the address information, and to then store the depth values in the depth cache 406. As such, when the processed pixel arrives through the pipeline to the HSR block 403, the depth values of a previously rendered pixel may be rapidly retrieved from the cache 406 for HSR processing.

The predictive pre-fetching technique of depth buffer management of an embodiment of present disclosure lends itself extremely well to the use of a so-called hierarchical z-buffer, and example of which is described next.

Figure 5:
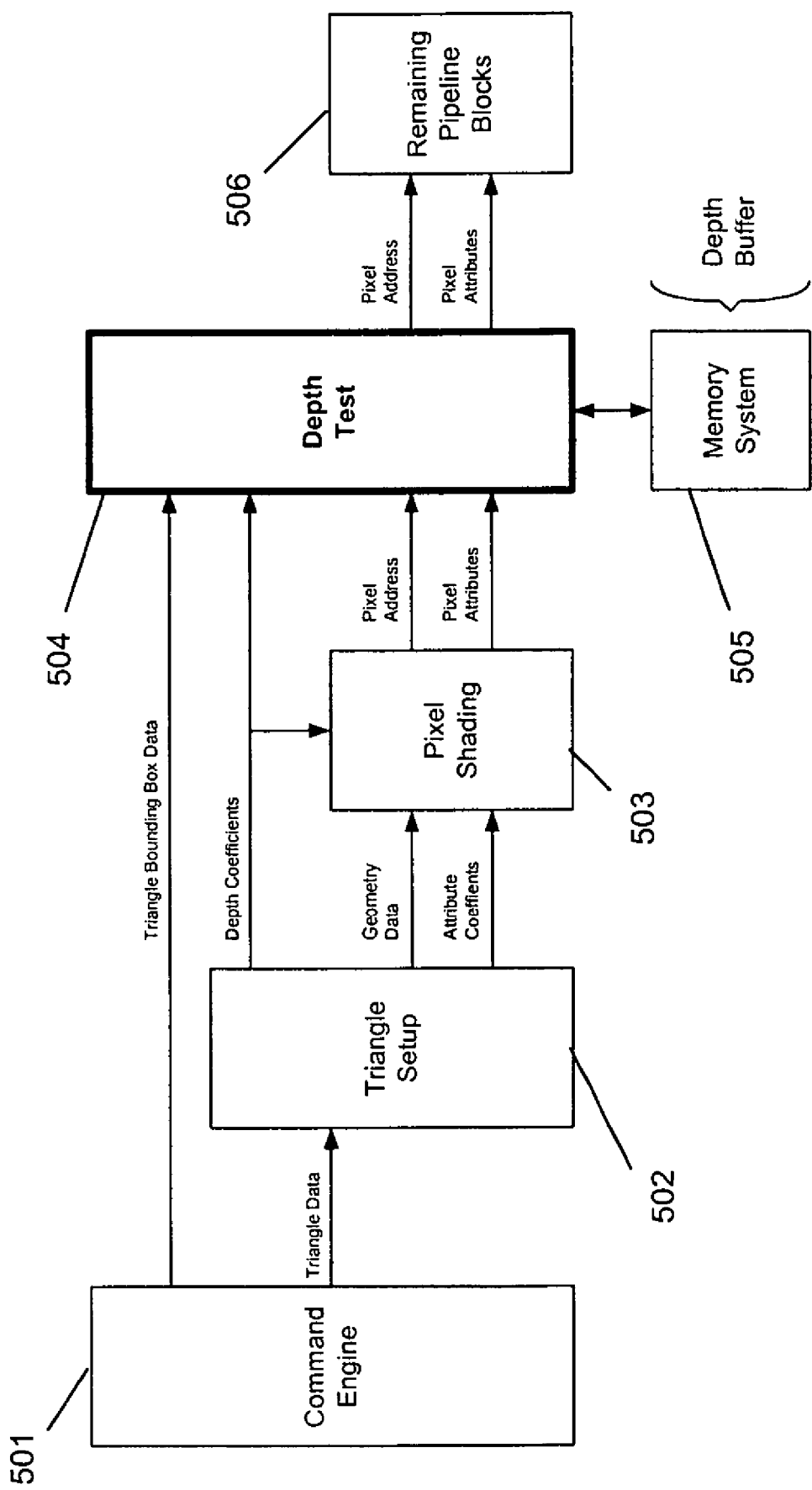
FIG. 5 illustrates of block diagram of another embodiment of the present disclosure in which the z-values of a tiles of pixels are predictively prefetched and stored in a cache.
Figure 6:
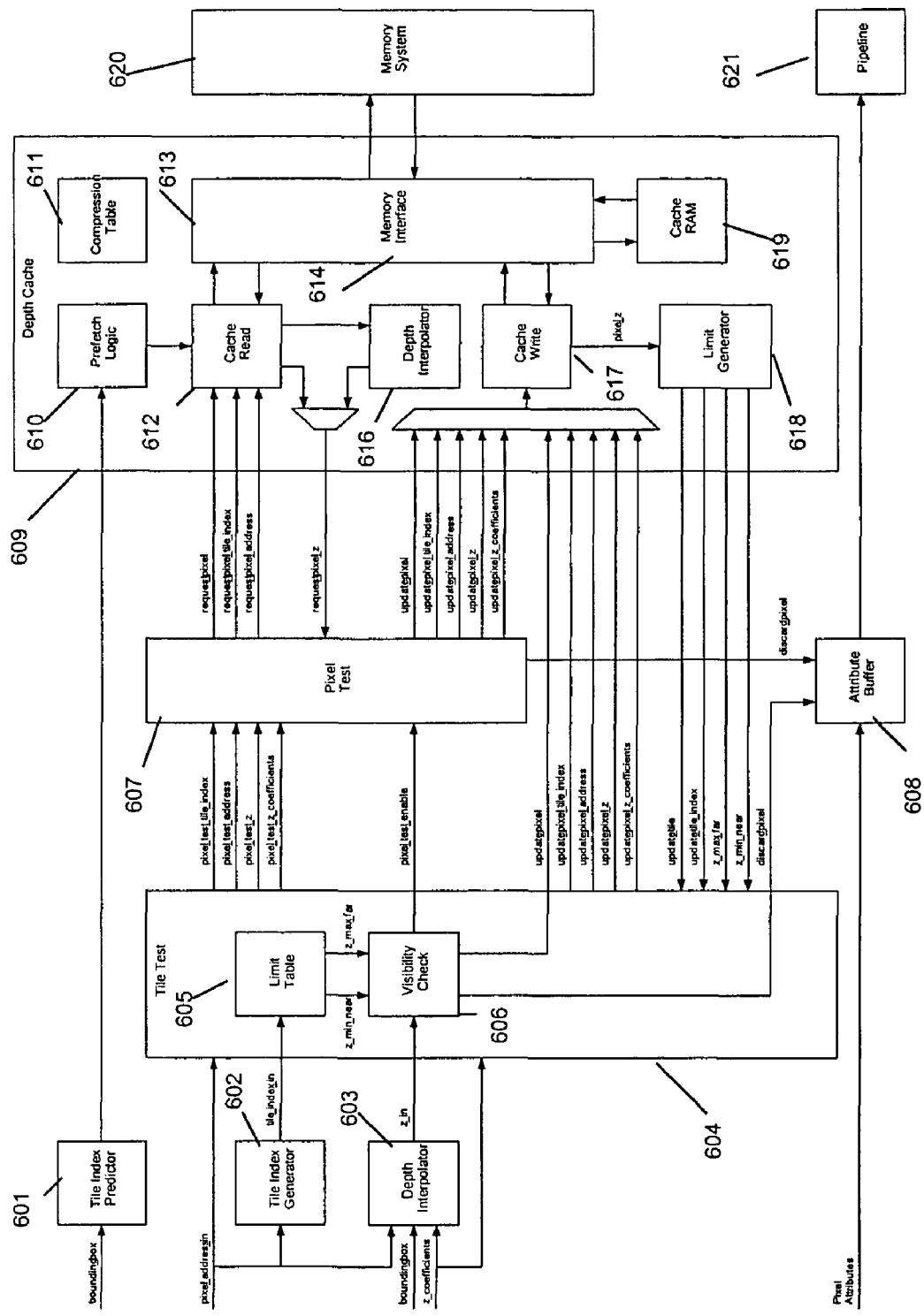
FIG. 6 illustrates of block diagram for explaining the operation of the depth cache illustrated in FIG. 5.

FIGS. 5 and 6 are functional block diagrams illustrating another embodiment of the present disclosure, in which FIG. 6 is a functional block diagram for explaining the operation of the depth test block 504 illustrated in FIG. 5.

Illustrated in FIG. 5 are a command engine 501, a triangle setup block 502, a pixel shading block 503, a depth test block 504 (containing a hierarchical z-buffer, not shown), a memory system 505 (containing a depth buffer), and remaining pipeline blocks 506.

In operation, triangle data from the command engine 501 is applied to the triangle setup block 502. The triangle setup block outputs corresponding depth coefficients, geometry data and attribute coefficients, which are all applied to the pixel shading block 503. Then, the pixel attributes and pixel address are supplied by the pixel shading block 503 to the depth test block 504, together with triangle bounding box data from the command engine 501, and the depth coefficients from the triangle setup block 502. The depth test block 504 then executes a depth test with respect to the processed pixel and depth values stored in cache memory (not shown). Preferably, the depth values are predictively retrieved from the memory system 505 and stored in cache memory in advance of actual execution of the depth test. The processed pixel is then either discarded as a result of the depth test, or transmitted to the remaining pipeline block 506 in the form of the pixel address and the pixel attributes.

As already mentioned, FIG. 6 is a functional block diagram for explaining the operation of the depth test block 504 illustrated in FIG. 5. As shown in FIG. 6, the depth test block of this example generally includes a tile index predictor 601, a tile index generator 602, a depth interpolator 603, a tile test block 604, a pixel test block 607, an attribute buffer 608, and a depth cache 609.

The attribute buffer 608 is used to store the pixel attributes of incoming pixels as they travel down the pipeline. The depth block is a pipeline, and the attribute buffer 608 matches the pipeline. As will be explained below, the discard_pixel signals are effectively erase or clear signals for pixels flowing through the pipeline 621.

The tile index predictor 601 utilizes bounding box information bounding_box to predictively generate a series of tile indexes indicative of tiles occupied by the processed triangle. As discussed previously in connection with FIG. 3, memory bandwidth efficiency is enhanced by predictive caching of tiles with respect to the processed triangles. Prefetch logic 610 utilizes the tile indexes from the tile index predictor 601 to control a cache read block 612 of the depth cache 609. The operation of the cache read block 612 will be explained later. However, the prefetch logic block 610 makes early tile requests of the cache read block 612 such that the later requested pixels from pixel test block (explained below) are more likely to be present in the cache RAM.

The tile index generator 602 generates a tile index signal tile_index_in from the incoming pixel address pixel_address_in. Note that since the same tile index would have been predicted earlier by the tile index predictor 601, logic may be shared between the tile index predictor 601 and tile index generator 602.

The depth interpolator 603 uses depth coefficients z_coefficients and bounding box information bounding_box to actually rasterize the depth value z_in for an incoming pixel address pixel_address_in. It is also possible to include the depth interpolator 603 as part of the shading block (see FIG. 5). However, in this example, the depth interpolator 603 has been implemented in the depth test block because the same interpolator may be used to decompress z in the event that only the coefficients are stored for any given tile. In this regard, note that the depth interpolator also appears inside the depth cache block 609.

The tile test block 604 is essentially a hierarchical z test block and is configured with a limit table 605 and a visibility check block 606. The limit table 605 contains the maximum far depth value (z-value) z_max_far and minimum near depth value (z-value) z_min_near for each screen tile. The tile_index from the tile index generator 602 is utilized as an address into limit table 605, and as a result, the limit table 605 produces the minimum depth value z_min_near and the maximum depth value z_max_far for the tile containing the processed pixel. The tile's minimum depth value z_min_near and maximum depth value z_max_far are then applied with z_in to the visibility check block 606. The visibility check block 606 compares z_in with z_min_near and z_max_far, with the comparison result having three possible outcomes, namely, z_in is farther than z_max_far for the tile, z_in is nearer than z_min_near for the tile, or z_in is nearer than z_max_far but farther than z_min_near for the tile.

In the case where z_in is farther than z_max_far for the tile, the pixel is discarded by operation of the discard_pixel signal to the attribute buffer 608.

In the case where z_in is nearer than z_min_near for the tile, the pixel is visible and must be updated by enablement of the update_pixel signal and transmission of the signals designated in FIG. 6 as update_pixel_tile_index, update_pixel_address, update_pixel_z, and update_pixel_z_coefficients to the cache write block 617. The cache write block 617 includes cache tag management. When a pixel is updated, cache write block 617 functions to update the cache RAM 619 and maintain data coherency with the external memory system 620. Also, when a tile is stored back into cache RAM 619 or external memory system 620, the cache write block 617 streams the depth information pixel_z of the tile to the limit generator 618.

The limit generator 618 computes the z_max_far and z_min_near of a tile as it is being stored into the memory system 620. Then, the update_tile signal is enabled, and the signals update_tile_index, the z_max_far and z_min_near are transmitted to the tile test block 604 so as to update the limit table 605.

As mentioned previously, the cache write block 617 receives the signals update_pixel_tile_index, update_pixel_address, update_pixel_z, and update_pixel_z_coefficients. The update_pixel_tile_index signal is essentially the cache block index (or cache line index). The update_pixel_address is a cache address utilized to address an individual pixel. The update_pixel_z is the individual depth value (z-value) for the individual pixel. The update_pixel_z_coefficients signal contains coefficients used as part of a z-compression technique. That is, the compression table 611 of the depth cache 609 keeps track of which tiles have only their coefficients stored. When such a tile is encountered by the cache read block 612, the coefficients are read from cache RAM 619 and then run through the depth interpolator 616 to recover the individual depth values.

In the case where z_in is nearer than z_max_far but farther than z_min_near, the pixel is between the minimum and maximum of the tile. As such, an individual pixel test is executed by enablement of the pixel_test_enable signal. In response, the signals request_pixel, request_pixel_tile_index and request_pixel_address are sent to the depth cache 609 by the pixel test block 607 to request the depth value of a previously processed pixel. The request_pixel signal is essentially a cache read command, and the request_pixel_tile_index and request_pixel_address are tile and pixel addresses, respectively. In response to these signals, the cache read block 612 retrieves the requested z-value of the previously processed pixel from the cache RAM 619 via the memory interface 613. The cache read block 612 includes cache tag checking and management. The requested z-value is supplied as the request_pixel_z signal to the pixel test block 607 which then determines whether the processed pixel is visible. If the pixel is determined to be not visible, then the discard_pixel signal is enabled as described previously with respect to the tile test block 604. If the pixel is determined to be visible, then the update_pixel signal is enabled, and the update_pixel_tile_index, update_pixel_address, update_pixel_z, and update_pixel_z_coefficients signals are utilized in the same manner as described previously in connection with the tile test block 604.

It is noted that another level of hierarchical z-buffer can be implemented in which complete triangles are discarded based on maximum and minimum values for a tile, if the triangle is completely within the tile.

The embodiment of FIGS. 5 and 6 utilizes a tile mode of operation in which depth values of pixel tiles are stored and retrieved from the depth buffer. To further enhance bandwidth efficiency, it may be desirable to compress the data representative of the pixel tiles. One such z-compression technique according to an embodiment of the present disclosure is described below.

In the description of this embodiment, it is assumed that the depth buffer is divided into a tile mode (4×4 pixels, e.g.) and triangles are rendered in tile mode.

Early in the pipeline process, depth values of the pixels of each triangle are computed from vertex information associated with the triangle. Typically, a linear interpolation is utilized for this purpose.

As such, if a tile corresponds to a place in the z-buffer that was updated by rendering a triangle, then the depth values in the tile can be represented as a linear function:

$$Z(x,y)=A_z x+B_z y+C_z$$

Here, x and y denote the horizontal and vertical coordinates of each pixel within the 4×4 tile. By giving the depth value of the upper-left pixel of the tile the value of ($Z_{00}$), $A_z$ and $B_z$, the remaining pixels of the tile can be obtained by interpolating the following equation:

$$Z_{ij}=A_z{}^*i+B_z{}^*j+Z_{00}, (i=0\sim 3, j=0\sim 3)$$

Thus, if a tile is compressible, instead of updating all its 16 pixels' depth values to the depth buffer, it is only necessary to update $Z_{00}$, $A_z$ and $B_z$. This is just 3/16 of a regular tile's information, assuming $A_z$ and $B_z$ has the same data precision as $Z_{00}$. When the same compressed tile is read back from z-buffer, it is only necessary to read $Z_{00}$, $A_z$ and $B_z$ and to execute a decompress function based on the above formula to obtain the depth values of the entire tile.

Figure 7:
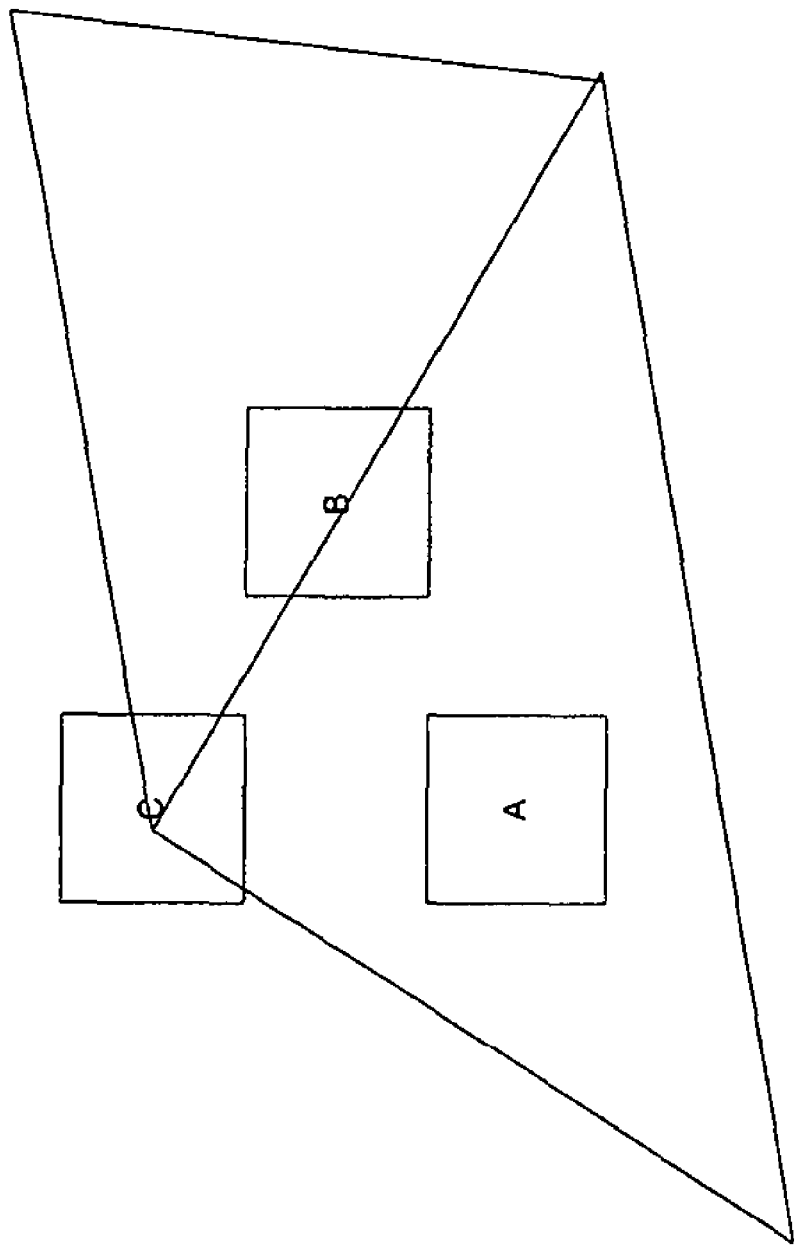
FIG. 7 is a view for explaining pixel tiles that are candidates for z-compression according to an embodiment of the present disclosure.

A tile can be compressed only if it is fully contained in a triangle, as illustrated in FIG. 7. As shown, tile A is compressible, while tiles B and C are not since they cross over a triangle boundary. To determine whether a tile falls completely within a triangle, is usually sufficient to examine whether all the four corner pixels of the tile are inside the triangle.

Since not every tile is compressible, an on-chip memory may be utilized to store an array of flags (1-bit per tile) that could indicate if a particular tile block is compressed in the depth buffer. When a tile is read from the depth buffer, its corresponding compression flag is examined to determine whether decompression of the data is needed. When a tile is being updated to the depth buffer, if it is compressible, the compressed data is written to the depth buffer and the corresponding compression flag is set.

In the drawings and specification, there have been disclosed typical preferred embodiments and, although specific examples are set forth, they are used in a generic and descriptive sense only and not for purposes of limitation. It should therefore be understood the scope of the present disclosure is to be construed by the appended claims, and not by the exemplary embodiments.

What is claimed is:

1. A graphics processor, comprising:
a rasterization pipeline comprising a plurality of sequentially arranged processing stages which render display pixel data from input primitive object data;
a memory which stores data utilized by at least one processing stage of the plurality of sequentially arranged processing stages of the rasterization pipeline, wherein the data utilized by the at least one processing stage comprises depth values of a two-dimensional screen tile of pixels; and
a pre-fetch mechanism which retrieves the data utilized by the at least one processing stage with respect to a processed pixel in advance of the processed pixel arriving at the at least one processing stage, wherein the retrieved data is stored in a cache memory of the at least one processing stage of the rasterization pipeline,
wherein the at least one processing stage includes a tile test block comprising a table that stores minimum and maximum depth values of the two-dimensional screen tile of pixels,
wherein the tile test block accesses the table to retrieve the minimum and maximum depth values of the two-dimensional screen tile of pixels, compares a depth value of the processed pixel with the minimum and maximum depth values of the two-dimensional screen tile of pixels, discards the processed pixel when the depth value of the processed pixel is greater than the maximum depth value of the two-dimensional screen tile of pixels, updates the cache memory with the depth value of the processed pixel when the depth value of the processed pixel is less than the minimum depth value of the two-dimensional screen tile of pixels, and enables a pixel test block to execute an individual pixel test when the depth value of the processed pixel is less than the maximum depth value of the two-dimensional screen tile of pixels and greater than the minimum depth value of the two-dimensional screen tile of pixels, and
wherein the pixel test block accesses the cache memory to retrieve one or more depth values of the two-dimensional screen tile of pixels, and compares the depth value of the processed pixel with the one or more depth values retrieved from the cache memory.

2. A graphics processor, comprising:
a rasterization pipeline comprising a plurality of sequentially arranged processing stages which render display pixel data from input primitive object data, wherein the processing stages include a hidden surface removal (HSR) stage;
a depth buffer which stores data utilized by the HSR stage of the rasterization pipeline, wherein the data utilized by the HSR stage comprises depth values of a two-dimensional screen tile of pixels; and
a pre-fetch mechanism which retrieves the data utilized by the HSR stage from the depth buffer with respect to a processed pixel in advance of the processed pixel arriving at the HSR stage through the rasterization pipeline, wherein the retrieved data is stored in a cache memory of the HSR stage of the rasterization pipeline,
wherein the HSR stage includes a tile test block comprising a table that stores minimum and maximum depth values of the two-dimensional screen tile of pixels,
wherein the tile test block accesses the table to retrieve the minimum and maximum depth values of the two-dimensional screen tile of pixels, compares a depth value of the processed pixel with the minimum and maximum depth values of the two-dimensional screen tile of pixels, discards the processed pixel when the depth value of the processed pixel is greater than the maximum depth value of the two-dimensional screen tile of pixels, updates the cache memory with the depth value of the processed pixel when the depth value of the processed pixel is less than the minimum depth value of the two-dimensional screen tile of pixels, and enables a pixel test block to execute an individual pixel test when the depth value of the processed pixel is less than the maximum depth value of the two-dimensional screen tile of pixels and greater than the minimum depth value of the two-dimensional screen tile of pixels, and
wherein the pixel test block accesses the cache memory to retrieve one or more depth values of the two-dimensional screen tile of pixels, and compares the depth value of the processed pixel with the one or more depth values retrieved from the cache memory.

3. The graphics processor of claim 2,
wherein the input primitive object data is indicative of a primitive shape containing the processed pixel, and wherein the depth values of the two-dimensional screen tile of pixels are compressed in the case where the two-dimensional screen tile of pixels is contained completely within the primitive shape.

4. The graphics processor of claim 3, wherein the primitive shape is a triangle.

5. The graphics processor of claim 4, wherein the two-dimensional screen tile of pixels is a 4×4 tile of pixels.

6. The graphics processor of claim 3, wherein the depth values of the two-dimensional screen tile of pixels are compressed by storing coefficients of an equation describing relative values of the depth values of the two-dimensional screen tile of pixels.

7. The graphics processor of claim 6, wherein the equation is a linear equation.

8. A graphic processor, comprising:
a rasterization pipeline comprising a plurality of sequentially arranged processing stages which render display pixel data from input primitive object data, wherein the processing stages include a hidden surface removal (HSR) stage;
a depth buffer which stores depth values of a two-dimensional screen tile of pixels;
a tile address generator which generates a tile address of the two-dimensional screen tile of pixels which includes a processed pixel;
a cache memory coupled to the HSR stage of the rasterization processor; and
a pre-fetch mechanism which is responsive to the tile address to retrieve the depth values of the two-dimensional screen tile of pixels from the depth buffer in advance of the processed pixel arriving at the HSR stage through the rasterization pipeline and to store the depth values of the two-dimensional screen tile of pixels in the cache memory, wherein the HSR stage includes a tile test block comprising a table that stores minimum and maximum depth values of the two-dimensional screen tile of pixels, wherein the tile test block accesses the table to retrieve the minimum and maximum depth values of the two-dimensional screen tile of pixels, compares a depth value of the processed pixel with the minimum and maximum depth values of the two-dimensional screen tile of pixels, discards the processed pixel when the depth value of the processed pixel is greater than the maximum depth value of the two-dimensional screen tile of pixels, updates the cache memory with the depth value of the processed pixel when the depth value of the processed pixel is less than the minimum depth value of the two-dimensional screen tile of pixels, and enables a pixel test block to execute an individual pixel test when the depth value of the processed pixel is less than the maximum depth value of the two-dimensional screen tile of pixels and greater than the minimum depth value of the two-dimensional screen tile of pixels, and wherein the pixel test block accesses the cache memory to retrieve one or more depth values of the two-dimensional screen tile of pixels, and compares the depth value of the processed pixel with the one or more depth values retrieved from the cache memory.

9. The graphics processor of claim 8, wherein the depth buffer comprises a hierarchical depth buffer.

10. A graphics processor, comprising:
a rasterization pipeline comprising a plurality of sequentially arranged processing stages which render display pixel data from input primitive object data; and
means for pre-fetching data with respect to a processed pixel from a memory and supplying the data to at least one processing stage of the plurality of sequentially arranged processing stages in advance of the processed pixel arriving at the at least one processing stage through the rasterization pipeline, wherein the data comprises depth values of a two-dimensional screen tile of pixels, wherein the data is stored in a cache memory of the at least one processing stage of the rasterization pipeline,
wherein the at least one processing stage comprises a table that stores minimum and maximum depth values of the two-dimensional screen tile of pixels, and means for comparing the depth value of the processed pixel with the minimum and maximum depth values of the two-dimensional screen tile of pixels, discarding the processed pixel when the depth value of the processed pixel is greater than the maximum depth value of the two-dimensional screen tile of pixels, updating the cache memory with the depth value of the processed pixel when the depth value of the processed pixel is less than the minimum depth value of the two-dimensional screen tile of pixels, and enabling execution of an individual pixel test when the depth value of the processed pixel is less than the maximum depth value of the two-dimensional screen tile of pixels and greater than the minimum depth value of the two-dimensional screen tile of pixels, and
wherein the at least one processing stage further comprises means for accessing the cache memory to retrieve one or more depth values of the two-dimensional screen tile of pixels, and comparing the depth value of the processed pixel with a previously stored depth value stored in the main memory in order to execute the individual pixel test.

11. The graphics processor as claimed in claim 10, wherein the at least one processing stage comprises a hidden surface removal (HSR) stage.

12. The graphics processor of claim 10,
wherein the primitive object data is indicative of a primitive shape containing the processed pixel,
wherein the at least one processing stage includes a hidden surface removal (HSR) stage,
wherein the memory comprises a depth buffer, and
wherein the graphics processor further comprises:
means for selectively compressing the depth values of the two-dimensional screen tile of pixels, wherein the depth values of the two-dimensional screen tile of pixels are compressed when the two-dimensional screen tile of pixels is contained completely within the primitive shape containing the processed pixel; and
means for storing the compressed depth values of the two-dimensional screen tile of pixels in the depth buffer.

13. A graphic processor, comprising:
a rasterization pipeline comprising a plurality of sequentially arranged processing stages which render display pixel data from input primitive object data, wherein the processing stages include a hidden surface removal (HSR) stage;
a hierarchical depth buffer which stores depth values of a two-dimensional screen tile of pixels;
a cache memory which is coupled to the HSR stage of the rasterization pipeline;
a tile address generator which generates a tile address of the two-dimensional screen tile of pixels which includes a processed pixel;
a pre-fetch mechanism which is responsive to the tile address to retrieve the depth values of the two-dimensional screen tile of pixels which includes the processed pixel from the hierarchical depth buffer in advance of the processed pixel arriving at the HSR stage through the rasterization pipeline and to store the depth values of the two-dimensional screen tile of pixels in the cache memory,
wherein the HSR stage includes a tile test block comprising a table that stores minimum and maximum depth values of the two-dimensional screen tile of pixels,
wherein the tile test block accesses the table to retrieve the minimum and maximum depth values of the two-dimensional screen tile of pixels, compares a depth value of the processed pixel with the minimum and maximum depth values of the screen tile of pixels which includes the processed pixel, discards the processed pixel when the depth value of the processed pixel is greater than the maximum depth value of the two-dimensional screen tile of pixels, updates the cache memory with the depth value of the processed pixel when the depth value of the processed pixel is less than the minimum depth value of the two-dimensional screen tile of pixels, and enables a pixel test block to execute an individual pixel test when the depth value of the processed pixel is less than the maximum depth value of the two-dimensional screen tile of pixels and greater than the minimum depth value of the two-dimensional screen tile of pixels, and
wherein the pixel test block accesses the cache memory to retrieve one or more depth values of the two-dimensional screen tile of pixels, and compares the depth value of the processed pixel with the one or more depth values retrieved from the cache memory.

14. The graphics process of claim 13, further comprising a tile index predictor block which generates screen tile information based on primitive object data associated with the processed pixel, wherein the prefetch mechanism retrieves depth values of screen tiles based on the screen tile information generated by the tile index predictor block.

15. A graphics processing method, comprising:
supplying primitive object data to a rasterization pipeline which includes a plurality of sequentially arranged processing stages which render display pixel data from input primitive object data;
storing data utilized by at least one processing stage of the plurality of sequentially arranged processing stages of the rasterization pipeline in a memory, wherein the data utilized by the at least one processing stage comprises depth values of a two-dimensional screen tile of pixels, wherein the at least one processing stage includes a tile test block comprising a table that stores minimum and maximum depth values of the two-dimensional screen tile of pixels;
pre-fetching from the memory the data utilized by the at least one processing stage with respect to a processed pixel in advance of the processed pixel arriving at the at least one processing stage;
storing the retrieved data in a cache memory of the at least one processing stage of the rasterization pipeline;
retrieving, with the tile test block, the minimum and maximum depth values of the two-dimensional screen tile of pixels from the table;
comparing, with the tile test block, a depth value of the processed pixel with the minimum and maximum depth values of the two-dimensional screen tile of pixels;
discarding, with the tile test block, the processed pixel when the depth value of the processed pixel is greater than the maximum depth value of the two-dimensional screen tile of pixels;
updating, with the tile test block, the cache memory with the depth value of the processed pixel when the depth value of the processed pixel is less than the minimum depth value of the two-dimensional screen tile of pixels;
enabling, with the tile test block, a pixel test block to execute an individual pixel test when the depth value of the processed pixel is less than the maximum depth value of the two-dimensional screen tile of pixels and greater than the minimum depth value of the two-dimensional screen tile of pixels;
retrieving, with the pixel test block, one or more depth values of the two-dimensional screen tile of pixels from the cache memory; and
comparing, with the pixel test block, the depth value of the processed pixel with the one or more depth values retrieved from the cache memory.

16. The method of claim 15, wherein the at least one processing stage comprises a hidden surface removal (HSR) stage.

17. The graphics process of claim 15, further comprising generating tile information based on primitive object data associated with the processed pixel, and prefetching depth values of screen tiles based on the tile information.

18. The graphics processing method of claim 15,
wherein the input primitive object data is indicative of a primitive shape containing the processed pixel,
wherein the at least one processing stage includes a hidden surface removal (HSR) stage,
wherein the memory comprises a depth buffer, and
wherein storing the data utilized by the at least one processing stage comprises:
selectively compressing the depth values of the two-dimensional screen tile of pixels, wherein the depth values of the two-dimensional screen tile of pixels are compressed when the two-dimensional screen tile of pixels is contained completely within the primitive shape containing the processed pixel; and
storing the compressed depth values of the two-dimensional screen tile of pixels in the depth buffer.

19. The graphics processing method of claim 18, wherein the primitive shape is a triangle.

20. The graphics processing method of claim 19, wherein the two-dimensional screen tile of pixels is a 4×4 tile of pixels.

21. The graphics processing method of claim 18, wherein the depth values of the two-dimensional screen tile of pixels are compressed by storing coefficients of an equation describing relative values of the depth values of the two-dimensional screen tile of pixels.

22. The graphics processing method of claim 21, wherein the equation is a linear equation.

* * * * *